United States Patent
Goykhman

(10) Patent No.: US 12,500,482 B2
(45) Date of Patent: Dec. 16, 2025

(54) INTERNALLY PRESSURIZED ELECTRIC MOTOR

(71) Applicant: EATON INTELLIGENT POWER LIMITED, Dublin (IE)

(72) Inventor: Mikhail Goykhman, Reseda, CA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 228 days.

(21) Appl. No.: 17/768,955

(22) PCT Filed: Oct. 13, 2020

(86) PCT No.: PCT/EP2020/025454
§ 371 (c)(1),
(2) Date: Apr. 14, 2022

(87) PCT Pub. No.: WO2021/073772
PCT Pub. Date: Apr. 22, 2021

(65) Prior Publication Data
US 2024/0106301 A1  Mar. 28, 2024

Related U.S. Application Data

(60) Provisional application No. 62/915,314, filed on Oct. 15, 2019.

(51) Int. Cl.
*H02K 9/06* (2006.01)
*H02K 3/40* (2006.01)
*H02K 9/26* (2006.01)

(52) U.S. Cl.
CPC ............ *H02K 9/06* (2013.01); *H02K 3/40* (2013.01); *H02K 9/26* (2013.01)

(58) Field of Classification Search
CPC .. H02K 9/06; H02K 9/26; H02K 9/12; H02K 3/40

(Continued)

(56) References Cited

U.S. PATENT DOCUMENTS

| | | | | |
|---|---|---|---|---|
| 2,594,003 | A | * | 4/1952 | Else .................... H02K 9/24 310/88 |
| 3,648,086 | A | * | 3/1972 | Renner ............... H02K 9/06 310/227 |
| 4,074,156 | A | | 2/1978 | Widstrand et al. |
| 6,037,683 | A | | 3/2000 | Lulay et al. |
| 6,483,022 | B1 | | 11/2002 | Packard |

(Continued)

FOREIGN PATENT DOCUMENTS

| | | | | |
|---|---|---|---|---|
| CN | 205960853 | U | * | 2/2017 |
| CN | 206850577 | U | * | 1/2018 |

(Continued)

OTHER PUBLICATIONS

International Search Report and Written Opinion of the International Searching Authority for International Patent Application No. PCT/EP2020/025454 mailed Feb. 10, 2021, 12 pages.

(Continued)

*Primary Examiner* — Jose A Gonzalez Quinones

(74) *Attorney, Agent, or Firm* — Merchant & Gould P.C.

(57) ABSTRACT

An electric motor can automatically generate an internal pressure around conductor windings of the stator. The electric motor can be used on an electric aircraft or other application having variable atmospheric pressure. The electric motor includes a fan configured to blow the gas into a flow path to generate increased internal pressure about the conductor windings. The fan may be mounted to the rotator of the electric motor. The flow path is restricted to increase the pressure difference of the air entering the electric motor.

16 Claims, 2 Drawing Sheets

(58) Field of Classification Search
USPC .............................. 310/55, 56, 60 R, 62, 63
See application file for complete search history.

(56) References Cited

U.S. PATENT DOCUMENTS

| | | | |
|---|---|---|---|
| 2003/0102728 | A1 | 6/2003 | Chen et al. |
| 2010/0181861 | A1 | 7/2010 | Takamatsu et al. |
| 2010/0187025 | A1* | 7/2010 | Takamatsu ............... B60K 6/46 |
| | | | 310/196 |
| 2011/0212677 | A1 | 9/2011 | Dooley |
| 2012/0194014 | A1 | 8/2012 | Lang |
| 2013/0334911 | A1 | 12/2013 | Meyer et al. |
| 2018/0342921 | A1* | 11/2018 | Razak .................... B64D 27/10 |

FOREIGN PATENT DOCUMENTS

| | | | | |
|---|---|---|---|---|
| CN | 209379933 | U | * | 9/2019 |
| DE | 202016106151 | U | * | 11/2016 |
| EP | 1 612 916 | A1 | | 1/2006 |
| EP | 2 708 702 | A2 | | 3/2014 |
| EP | 2 860 855 | A1 | | 4/2015 |
| EP | 2958217 | A1 | * | 12/2015 |
| EP | 3 406 525 | A1 | | 11/2018 |
| EP | 3 421 734 | A1 | | 1/2019 |
| FR | 2731306 | A1 | * | 9/1996 ........... F04D 29/544 |
| GB | 583 798 | A | | 12/1946 |
| GB | 2112585 | A1 | * | 7/1983 ............... H02K 5/10 |
| GB | 2574826 | A | | 12/2019 |
| JP | 2010035362 | A | * | 2/2010 |

OTHER PUBLICATIONS

European Office Action for Application No. 20804437.0 mailed Feb. 27, 2025.

* cited by examiner

INTERNALLY PRESSURIZED ELECTRIC MOTOR

CROSS-REFERENCE TO RELATED APPLICATION

This application is a National Stage Application of PCT/EP2020/025454 filed on Oct. 13, 2020, which claims the benefit of U.S. Patent Application Ser. No. 62/915,314, filed on Oct. 15, 2019, the disclosures of which are incorporated herein by reference in their entireties. To the extent appropriate, a claim of priority is made to each of the above disclosed applications.

BACKGROUND

More-electric aircraft and all-electric aircraft are increasingly becoming more relevant in the aerospace industry. To optimize the design of these new air vehicles, high voltage and high current electrical systems are being introduced into new models. Various voltages are now being proposed for future aircraft, e.g., from 230 V AC to 4000 V DC and above.

When using high voltages at aircraft level altitudes, partial discharges are more likely to occur unless precautions are taken. Known techniques for mitigating partial discharge between current carrying conductors include increasing the distance between the conductors and/or increasing the insulation around the conductors. These approaches are not practical when conductors need to be tightly wound inside a size optimized package.

SUMMARY

Some aspects of the disclosure are directed to systems and methods of inhibiting corona discharge within an electric motor on an aircraft even while the aircraft is operating above sea level. The electric motor includes conductor windings disposed within a non-hermetically sealed interior. The method includes using a fan to blow gas into a flow path extending through the electric motor and past conductor windings to increase internal pressure around the conductor windings.

In certain implementations, the fan only when the electric motor is in operation. In some examples, the fan is operated by a shaft that rotates relative to the stator when the electric motor is operated. In other examples, the fan is operated separate from the shaft.

In some implementations, the flow path includes at least one inlet and no outlet. In other implementations, the flow path includes at least one inlet and at least one outlet. In certain examples, the flow path includes multiple inlets. In certain examples, the flow path includes multiple outlets.

The flow path is restricted to increase a pressure difference between the interior of the electric motor and an exterior of the electric motor. In certain implementations, the surface area defined by the inlets is larger than the surface defined by the outlets. In certain implementations, the flow path is restricted (e.g., the passageway is narrowed) within the interior between the inlet and outlet. In certain implementations, the flow path does not have an outlet.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to an electric device (e.g., an electric motor) for use on an electric aircraft (e.g., partially-electric aircraft or all-electrical aircraft) or other flying vehicle. Internal pressure is generated inside the electric device to mitigate the occurrence of corona discharges within the electric device. In particular, pressure is artificially increased around conductors within the electric device. In certain examples, the increased pressure is generated at the electric device (e.g., by a fan).

Figure 1:
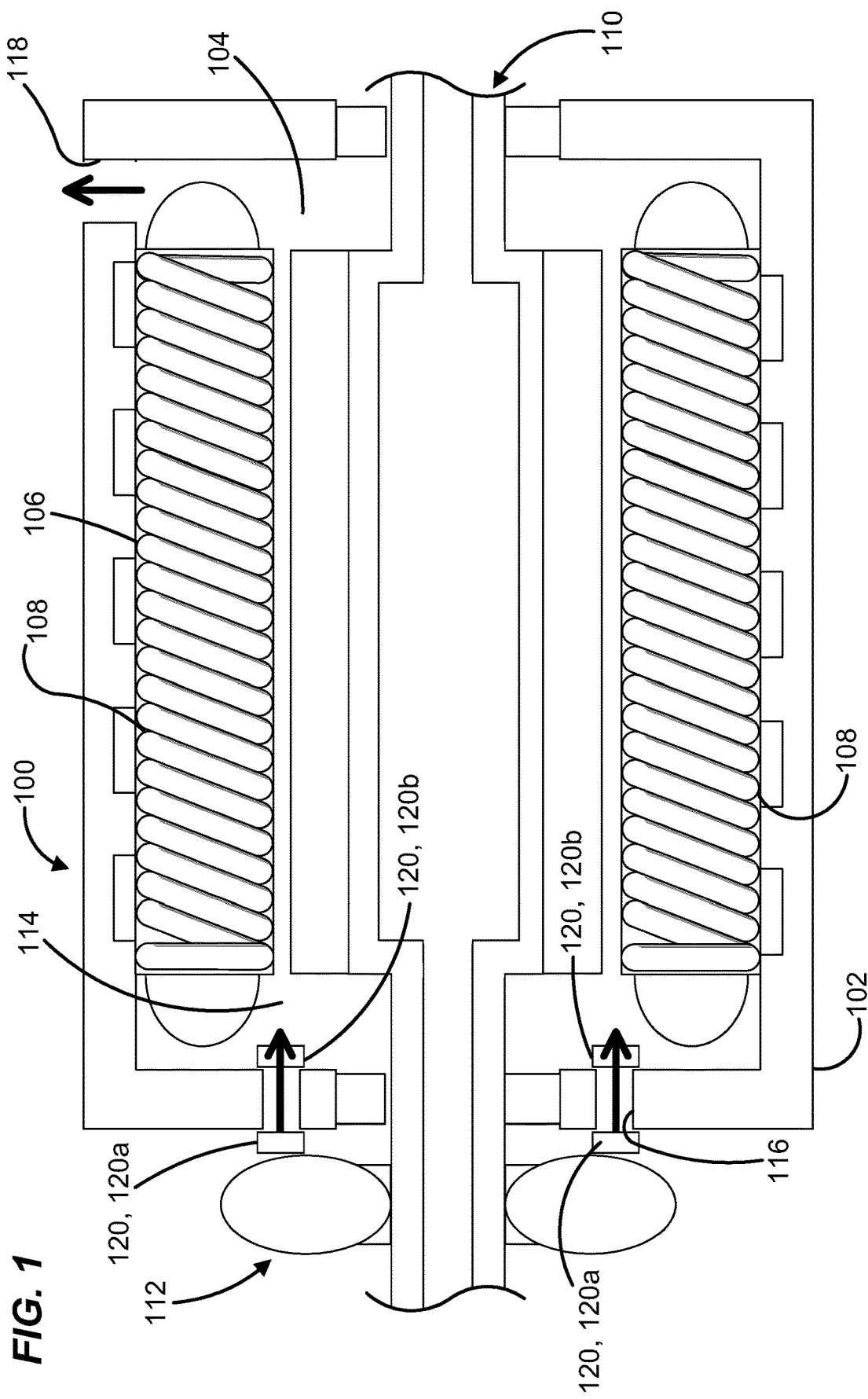
FIG. 1 is a schematic diagram of an example electric motor including a fan configured to flow gas into a first example flow path extending past a stator in accordance with principles of the present disclosure.
Figure 2:
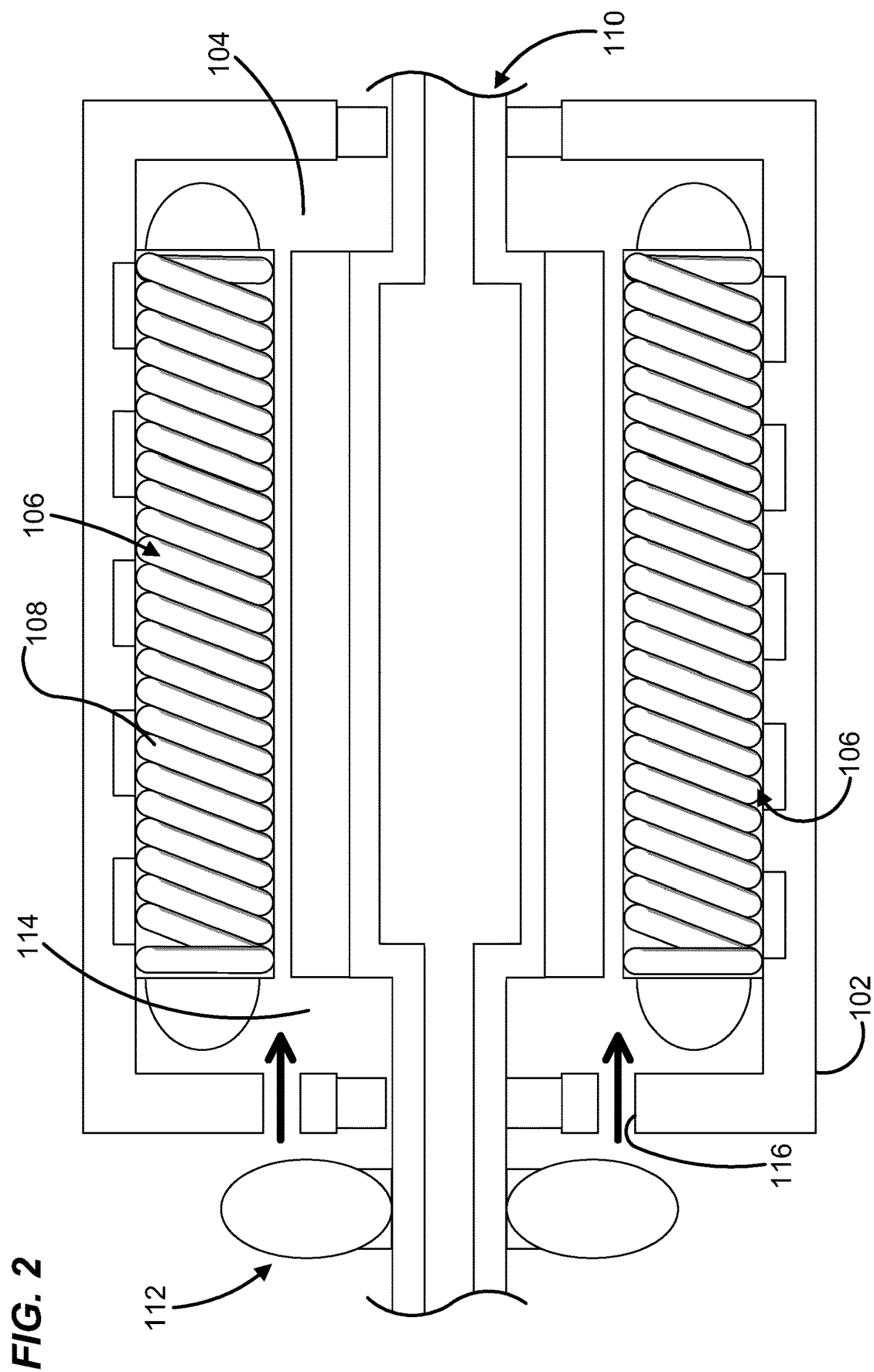
FIG. 2 is a schematic diagram of another example electric motor including a fan configured to flow gas into a second example flow path extending past a stator in accordance with principles of the present disclosure.

Referring to FIGS. 1 and 2, an electric motor 100 includes a housing 102 defining an interior 104. The interior 104 of the housing 102 is not hermetically sealed. A stator 106 is disposed within the housing 102. The stator 106 includes conductor windings 108. Since the interior 104 is not hermetically sealed, the windings 108 are typically exposed to the external pressure of the gas (e.g., air) surrounding the electric motor 100.

A shaft 110 is disposed within the housing 102 to extend through the stator 106. The shaft 110 is rotatable relative to the stator 106. The shaft 110 is made to rotate using the electro-magnetic field generated by the stator 106, thereby converting electrical energy to mechanical energy. The mechanical energy can be distributed to other components within the aircraft through the rotating shaft 110.

In certain implementations, the electric motor 100 is a propulsion motor that rotates one or more propellers and/or fans to move the aircraft. In certain implementations, the electric motor 100 rotates one or more pumps (e.g., a hydraulic pump, a fuel pump, etc.) within the aircraft. In certain implementations, the electric motor 100 powers an environmental control system. Other applications are possible.

Operating the electric motor 100 using high voltages (e.g., 270 VDC, 330 VDC, 4000 VDC, 230 VAC, etc.) allows the electric motor 100 to be provided in a smaller package compared to low voltage models (e.g., 28 VDC). However, higher voltage also tends to lead to increased occurrences of corona discharges. Operating the electric motor 100 at high altitudes also results in reduced atmospheric pressure around the conductor windings 108 within the stator 106. This reduced atmospheric pressure also tends to lead to increased occurrences of corona discharges.

To counter-act the reduced atmospheric pressure around the conductor windings 108, the electric motor 100 is configured to generate increased internal pressure around the stator 106. In certain implementations, the electric motor 100 includes a fan 112 to blow gas (e.g., air) into a flow path 114 within the interior 104 of the electric motor 100 to generate increased internal pressure about the conductor windings 108. The flow path 114 extends through the interior 104 from one or more inlets 116 at or near the fan 112. In general, the flow path 114 is restricted to increase a pressure difference of gas entering the interior 104 through the one or more inlets 116.

In some implementations, the fan 112 and flow path 114 cooperate to generate an internal pressure approaching atmospheric pressure at sea level. In certain examples, the fan 112 and flow path 114 cooperate to generate an internal pressure of at least 0.5 atmospheres. In certain examples, the fan 112 and flow path 114 cooperate to generate an internal pressure of at least 0.75 atmospheres. In certain examples, the fan 112 and flow path 114 cooperate to generate an internal pressure of at least 1 atmosphere. In certain implementations, the fan 112 and flow path 114 cooperate to generate an internal pressure exceeding atmospheric pressure at sea level. For example, in certain implementations, the fan 112 and flow path 114 cooperate to generate an internal pressure of at least 1.5 atmospheres. In certain examples, the fan 112 and flow path 114 cooperate to generate an internal pressure of at least 2 atmospheres. In certain examples, the fan 112 and flow path 114 cooperate to generate an internal pressure of at least 3 atmospheres. In certain examples, the fan 112 and flow path 114 cooperate to generate an internal pressure of at least 4 atmospheres. In certain implementations, the fan 112 and flow path 114 cooperate to generate an internal pressure of at least 5 atmospheres. In certain examples, the fan 112 and flow path 114 cooperate to generate an internal pressure of at least 10 atmospheres.

By generating increased pressure within the electric motor 108, the thickness of the insulation around the conductor windings 108 can be reduced compared to non-pressurized windings at the same altitude. Accordingly, the spacing between adjacent coils of the conductor windings 108 can be reduced. In certain examples, the conductor windings 108 are spaced no more than 20 mm apart. In certain examples, the conductor windings 108 are spaced no more than 10 mm apart. In certain examples, the conductor windings 108 are spaced no more than 5 mm apart. In certain examples, the conductor windings 108 are spaced no more than 1 mm apart. In certain examples, the conductor windings 108 are spaced no more than 0.5 mm apart.

In some implementations, the flow path 114 extends between the one or more inlets 116 and one or more outlets 118 (e.g., see FIG. 1). In some such examples, a total open area defined by the outlets 118 is less than a total open area defined by the inlets 116. Accordingly, more gas enters the flow path 114 than exits the flow path 114, thereby increasing the pressure within the interior 104. In certain examples, the flow path 114 has more inlets 116 than outlets 118. In certain examples, at least one of the inlets 116 is larger than at least one of the outlets 118. In other such examples, portions of the flow path 114 within the interior 104 may be restricted to increase the pressure difference. In other implementations, the flow path 114 does not have an outlet 118 (e.g., see FIG. 2). Rather, the fan 112 pushes gas into the interior 104 along the flow path 114 until the pressure within the interior 104 is sufficiently high to counteract the pressure generated by the fan 112.

Using the fan 112 and restricted flow path 114 generates the internal pressure at the electric motor 100. Accordingly, pressurized gas does not need to be separately stored, maintained, and distributed to the electric motor 100.

In some implementations, the fan 112 mounts to the shaft 110 and rotates with the shaft 110. Mounting the fan 112 to the shaft 110 reduces the number of additional parts necessary to operate the electric motor 100. Reducing the number of additional parts reduces the packaging size (or at least mitigates a needs to increase the packaging size) for the electric motor 100. In addition, attaching the fan 112 to the shaft 110 generates the increased internal pressure when the electric motor 100 is in operation. Accordingly, the increased internal pressure is generated when the wiring needs to be pressurized to protect against corona discharge. However, energy and resources are not wasted in generating such pressure while the electric motor 100 is not in use. In other implementations, however, the fan 112 can be mechanically supported separate from the electric motor 100. In certain examples, the fan 112 may be controlled separate from the electric motor 100.

In certain implementations, one or more filter arrangements 120 can be disposed at the one or more inlets 116 and/or at the one or more outlets 118. The filter arrangement 120 catches external contaminants carried by the gas blown by the fan 112. In some implementations, an example filter arrangement 120A is disposed external of the housing 102 (e.g., at or near the one or more inlets 116) to inhibit contaminants from initially entering the flow path 114. In other implementations, an example filter arrangement 120B is disposed within the interior 104 of the housing 102 (e.g., at or near the one or more inlets 116) to clean the gas passing through the flow path 114. In certain implementations, the filter arrangements 120, 120A, 120B can be disposed internal or external of the housing 102 at or near the outlets 118.

Having described the preferred aspects and implementations of the present disclosure, modifications and equivalents of the disclosed concepts may readily occur to one skilled in the art. However, it is intended that such modifications and equivalents be included within the scope of the claims which are appended hereto. For example, the fan 112 and flow path 114 may be applied to electrical devices other than electric motors.

What is claimed is:

1. An electrical device for use on an electric aircraft, the electrical device comprising:
   a housing defining an interior, the housing not being hermetically sealed;
   electrical components disposed within the interior of the housing;
   a flow path extending through the interior of the housing from an inlet into the housing, the flow path extending past the electrical components, the flow path being configured to increase a pressure difference of gas entering the interior through the inlet; and
   a fan configured to blow the gas into the flow path to generate increased internal pressure about the electrical components;
   wherein the housing defines an outlet with a fixed area designed to maintain pressure within the interior; and
   wherein the fixed area of the outlet of the housing is configured to restrict gas blown through the housing by the fan to increase the internal pressure to a pressure level which reduces corona discharges from the electrical components and wherein the outlet is smaller than the inlet;

wherein the flow path extends from the inlet to the outlet;

wherein the electrical device is an electric motor, wherein the electrical motor includes a stator disposed within the interior and a shaft extending through the stator and being rotatable relative to the stator; wherein the electrical components include conductor windings of the stator;

wherein the fan is mounted to the shaft, wherein operation of the fan is tied to operation of the shaft so that the increased internal pressure is generated about the conductor windings when the shaft is rotating relative to the stator; and wherein the electric device is a propulsion motor that rotates a propeller of the electric aircraft.

2. The electrical device of claim 1, wherein the inlet is one of a plurality of inlets.

3. The electrical device of claim 2, wherein the outlet is one of a plurality of outlets, wherein a total cross-sectional area defined by the plurality of outlets is less than a total cross-sectional area defined by all of the one or more inlets.

4. The electrical device of claim 1, wherein the flow path is restricted within the housing between the inlet and the outlet.

5. The electrical device of claim 1, further comprising a filter disposed at the inlet of the housing to inhibit introduction of contaminants into the flow path.

6. The electrical device of claim 5, wherein the filter is disposed upstream of the fan.

7. The electrical device of claim 5, wherein the filter is disposed downstream of the fan.

8. The electrical device of claim 1, wherein the fan is disposed upstream of the inlet.

9. The electrical device of claim 1, wherein all adjacent windings of the conductor windings are separated by no more than 30 mm.

10. The electrical device of claim 1, wherein the internal pressure is at least higher than external atmospheric pressure.

11. The electrical device of claim 10, wherein the internal pressure is at least 1 atmosphere.

12. A method of inhibit corona discharge within an electric motor on an aircraft operating above sea level, the electric motor including a motor housing defining a non-hermetically sealed interior, the electric motor including conductor windings within the non-hermetically sealed interior, the method comprising:

operating the aircraft in flight above sea level;

while the aircraft is in flight using a fan to blow gas into a flow path extending through the non-hermetically sealed interior of the electric motor and past conductor windings to increase internal pressure around the conductor windings to maintain a pressure of at least 0.5 atmospheres around the conductor windings during flight to reduce a likelihood of corona discharges within the non-hermetically sealed interior, and wherein the pressure is maintained at or above 0.5 atmospheres around the conductor windings by blowing the gas along the flow path from an inlet to an outlet of the motor housing, wherein the inlet and the outlet have fixed areas, and wherein a fixed area of the outlet is sufficiently smaller than a fixed area of the inlet to cause restriction of the gas flow exiting the non-hermetically sealed interior to level at which the pressure within the non-hermetically sealed interior is maintained at or above 0.5 atmospheres during flight.

13. An electrical device for use on an electric aircraft, the electrical device comprising:

a housing defining an interior, the housing not being hermetically sealed;

electrical components disposed within the interior of the housing;

a flow path extending through the interior of the housing from an inlet into the housing, the flow path extending past the electrical components, the flow path being configured to increase a pressure difference of gas entering the interior through the inlet;

a fan configured to blow the gas into the flow path to generate increased internal pressure about the electrical components; and wherein the electrical device is an electric motor, wherein the electrical motor includes a stator disposed within the interior and a shaft extending through the stator and being rotatable relative to the stator; wherein the electrical components include conductor windings of the stator;

wherein the fan is mounted to the shaft, wherein operation of the fan is tied to operation of the shaft so that the increased internal pressure is generated about the conductor windings when the shaft is rotating relative to the stator; and wherein the electric device is a propulsion motor that rotates a propeller of the electric aircraft wherein the housing does not define an outlet for the flow path, and wherein the fan is configured to increase internal pressure is generated about the conductor windings until the pressure within the housing is sufficiently high to counteract the pressure generated by the fan.

14. The electrical device of claim 1, wherein the inlet extends axially into the housing parallel to a length of the shaft, and the outlet extends radially outward through the housing relative to the length of the shaft.

15. The electrical device of claim 3, wherein the outlet openings are positioned farther radially outward from a center axis than all of the inlet openings.

16. The electrical device of claim 1, wherein the flow path is restricted within the interior of the housing to increase pressure between the inlet and the outlet.

* * * * *